US007014911B2

(12) United States Patent
Harris

(10) Patent No.: US 7,014,911 B2
(45) Date of Patent: Mar. 21, 2006

(54) METHOD OF APPLYING A CONTINUOUS ADHESIVE FILAMENT TO AN ELASTIC STRAND WITH DISCRETE BOND POINTS AND ARTICLES MANUFACTURED BY THE METHOD

(75) Inventor: Michael Harris, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 11/130,284

(22) Filed: May 16, 2005

(65) Prior Publication Data

US 2005/0208277 A1 Sep. 22, 2005

Related U.S. Application Data

(62) Division of application No. 10/282,708, filed on Oct. 29, 2002, now Pat. No. 6,936,125.

(60) Provisional application No. 60/364,613, filed on Mar. 15, 2002.

(51) Int. Cl.
*B32B 27/04* (2006.01)

(52) U.S. Cl. ........................ 428/198; 428/375; 428/378

(58) Field of Classification Search ................ 428/198, 428/375, 378
See application file for complete search history.

(56) References Cited

U.S. PATENT DOCUMENTS

| | | | |
|---|---|---|---|
| 4,031,854 A | 6/1977 | Sprague, Jr. | 118/641 |
| 4,135,903 A | 1/1979 | Ohsato et al. | 65/5 |
| 4,185,981 A | 1/1980 | Ohsato et al. | 65/5 |
| 4,844,003 A | 7/1989 | Slautterback et al. | 118/323 |
| 5,171,512 A | 12/1992 | Mende et al. | 264/555 |
| 5,267,693 A | 12/1993 | Dickey | 239/417.3 |
| 5,342,647 A | 8/1994 | Heindel et al. | 427/2.31 |
| 5,553,758 A | 9/1996 | Melendy et al. | 222/533 |
| 5,645,220 A | 7/1997 | Hohndord | 239/301 |
| 5,785,258 A | 7/1998 | Akin et al. | 239/590 |
| 5,882,573 A | 3/1999 | Kwok et al. | 264/510 |
| 5,902,540 A | 5/1999 | Kwok | 264/555 |
| 5,904,298 A | 5/1999 | Kwok et al. | 239/135 |
| 5,921,476 A | 7/1999 | Akin et al. | 239/590 |
| 6,250,357 B1 | 6/2001 | Niedermeyer | 156/436 |
| 6,311,899 B1 | 11/2001 | Hidaka et al. | 239/298 |
| 6,361,634 B1 | 3/2002 | White et al. | 156/161 |

FOREIGN PATENT DOCUMENTS

| | | |
|---|---|---|
| EP | 0792744 A2 | 3/1997 |
| JP | 11244774 A | 9/1999 |
| JP | 2001259497 | 9/2001 |

OTHER PUBLICATIONS

Syang-Peng Rwei, *Dog-Legging in the Melt Spinning Process*, Polymer Engineering and Science, vol. 38, No. 2, pp. 341-347, Feb. 1998.

J&M Laboratories, *Durastitch™ Technology*, New Product Release Manual, Feb. 1997.

Rajiv S. Rao et al., *Vibration and Stability in the Melt Blowing Process*, Ind. Eng. Chem., 32, pp. 3100-3111, 1993.

*Primary Examiner*—Alexander S. Thomas
(74) *Attorney, Agent, or Firm*—Wood, Herron & Evans, L.L.P.

(57) ABSTRACT

A method of securing an elastic strand to a flat substrate or sheet of material moving the elastic strand and the sheet in a converging manner from a first position in which the elastic strand is spaced from the sheet to a second position in which the elastic strand contacts one surface of the sheet. A filament of adhesive is dispensed onto the strand in a pattern configured with adhesive masses coupled by thinner filament sections. The adhesive masses are contacted with the strand when the strand is in the first position. The strand is bonded to the substrate with at least the adhesive masses.

4 Claims, 6 Drawing Sheets

METHOD OF APPLYING A CONTINUOUS ADHESIVE FILAMENT TO AN ELASTIC STRAND WITH DISCRETE BOND POINTS AND ARTICLES MANUFACTURED BY THE METHOD

CROSS-REFERENCE TO RELATED APPLICATIONS

This application is a divisional of U.S. application Ser. No. 10/282,708, filed Oct. 29, 2002, now U.S. Pat. No. 6,936,125 and claims the benefit of U.S. Provisional Application No. 60/364,613 filed on Mar. 15, 2002 (expired), and the disclosures of which are hereby incorporated by reference herein.

FIELD OF THE INVENTION

The present invention generally relates to technology associated with applying continuous adhesive filaments to one or more elastic strands for securing the elastic strands to flat substrates and, more particularly, to the securement of elastic strands to substrates such as those used in producing hygienic articles (e.g., diapers).

BACKGROUND OF THE INVENTION

Many reasons exist for dispensing liquid adhesives, such as hot melt adhesives, in the form of a thin continuous filament with a controlled pattern. Conventional patterns used in the past have been overlapping patterns, more specifically a swirling pattern typically caused by impacting the filament with a plurality of jets of air. This is generally known as Controlled Fiberization™ or CF™ in the hot melt adhesive dispensing industry. Controlled fiberization techniques are especially useful for accurately covering a wider region of a substrate with adhesive dispensed as single filaments or as multiple side-by-side filaments from nozzle passages having small diameters, such as on the order of 0.010 inch to 0.060 inch. The width of the adhesive pattern placed on the substrate can be widened to many times the width of the adhesive filament. Moreover, this technique is used to provide better control of the adhesive placement. Other adhesive filament dispensing techniques and apparatus have been used for producing a nonoverlapping vacillating pattern of adhesive on a substrate which, for example, may be a generally sinusoidal pattern or a stitching pattern in which the adhesive moves back-and-forth generally in a zig-zag form on the substrate.

In various types of manufacturing operations, it is necessary to bond thin elastic strands to one or more sheets of material, such as woven or nonwoven materials. This practice is especially prevalent in the area of hygienic article manufacture, such as during the manufacture of diapers. Diaper manufacturing involves the application of fiberized adhesives, including temperature and/or pressure sensitive adhesives, onto flat substrates and stretched elastic strands, for example, in the areas of the waistband, leg cuffs, and standing leg gathers of the diapers. In these situations, it has been common practice to dispense continuous adhesive fibers or filaments onto either single elastic strands or multiple elastic strands at the same time, either before or after the stretched elastic strand has been laid against the substrate, to bond the strand(s) to the substrate(s). In this manner, overlapping portions of the same substrate material may be bonded together with the elastic strand(s) secured therebetween or two distinctly different substrates may be bonded together with the elastic strand secured therebetween. This is a popular manner to elasticize specific areas of an article comprised of at least one flat substrate.

Controlled Fiberization techniques impart a generally back and forth motion to a dispensed filament of adhesive in the preferred form of a swirl by impacting the filament with a plurality of jets of air. This swirl generally takes the form of a repeated circular pattern when dispensed onto a substrate. When using CF nozzles to dispense swirling filaments of adhesive onto elastic strands, the continuous adhesive filament wraps itself around the strand(s) of elastic prior to joining the elastic strand(s) to the substrate.

Other adhesive filament dispensing techniques and apparatus have been used which involve dispensing a nonoverlapping vacillating, omega-shaped, or other types of back and forth patterns of adhesive on an elastic strand. Still other elastic strand securing methods include extruding a continuous layer of adhesive onto the strand after the strand has contacted the substrate. Various meltblowing techniques have also been used which essentially use randomly dispersed filaments of adhesive discharged onto one or more elastic strands either before or after the elastic strands have contacted the substrate.

Some of the continuing needs for improvement in this area of technology relate to achieving the necessary bond strength between the elastic strands and the substrates while at the same time transferring the desired elastic properties of the strands to the substrates. Another goal is to use as little adhesive as possible. In addition to undesirable cost increase, using too much adhesive tends to stiffen the substrate and reduce the elastic properties of the strand(s). This latter effect leads to reduced elasticity in critical areas of the diaper, such as the waistband, leg cuffs, and standing leg gathers. In addition, large fiber patterns may obstruct the communication of moisture between layers, such as between an inner layer and an absorbent outer layer.

For these and other reasons, it would be desirable to provide a method of securing one or more elastic strands to a flat substrate or sheet in a manner suitable for a high speed manufacturing environment, while also achieving the necessary bond strength, creep resistance, efficient use of adhesive, and optimization of other desired characteristics of the resulting product.

SUMMARY OF THE INVENTION

The present invention therefore provides a method of securing an elastic strand to a flat substrate or sheet of material generally including moving the elastic strand and the sheet in a converging manner from a first position in which the elastic strand is spaced from the sheet to a second position in which the elastic strand contacts one surface of the sheet. Preferably, the elastic strand is in a stretched condition during the securement method. A continuous filament of adhesive is dispensed onto the strand in a pattern configured with distinct adhesive areas of increased mass coupled by thinner filament sections. These areas of increased adhesive will be referred to herein generally as adhesive masses with the understanding that they may take various forms, typically irregular in shape, due to the fact that they are formed by an adhesive filament that has crossed over onto itself at least once or otherwise conglomerated at a distinct area. The adhesive masses are contacted with the strand when the elastic strand is in the first position. The spacing between the elastic strand and the sheet at the first position is sufficient to allow the adhesive to flow and/or wrap underneath the strand prior to reaching the second position. The elastic strand is then bonded to the substrate at the second position using at least the adhesive masses which have been accurately dispensed onto the strand in serial, spaced apart fashion.

In some applications, it may be advantageous to break some or all of the thinner filament sections between the adhesive masses to form discrete, separated dots of adhesive on the elastic strand. This may be accomplished by appropriate adjustment of the process air pressure in the preferred embodiment. In other applications it may be advantageous to retain at least some of the thinner filament sections between the adhesive masses. In this case, the retained thinner filament sections may wrap around the elastic strand before the elastic strand reaches the second position and is bonded to the sheet of material. To achieve the strongest bond, the adhesive masses should flow around all sides of the elastic strand prior to the strand contacting the sheet of material. However, in various applications satisfactory results will be obtained if the adhesive flows only partially around the strand. In most situations, the goal is to achieve uniform elasticity along the length of the elastic strand(s) following adherence thereof to the substrate or sheet of material.

In a preferred form of the method, a continuous filament of adhesive is dispensed in a swirl pattern having crossover points coupled to each other by thinner filament sections. The crossover points thereby form spaced apart masses of adhesive on the elastic strand which are preferably substantially larger in width that the thinner filament sections therebetween. Typically, the adhesive masses are at least twice the width of the thinner filament sections. These adhesive masses then bond the elastic strand to the sheet of material. The adhesive masses may vary in number per unit length of the strand. Again, in this embodiment the thinner filament sections may or may not be retained to connect the adhesive masses together during the bonding operation.

The methods of this invention may be applied to situations involving the securement of more than one elastic strand to a sheet of material or substrate. Multiple spaced apart elastic strands are used in the manufacture of various articles, such as in diaper manufacture, to form elasticized sections of the article. In these situations, a plurality of discharge orifices, which may be round orifices or elongate slots, are positioned adjacent a corresponding plurality of elastic strands. Filaments of adhesive are then applied in essentially parallel lines along each of the respective elastic strands in accordance with the inventive method as described herein.

The invention further contemplates articles formed from one or more flat substrates or sheets of material with at least one elastic strand adhered thereto in accordance with the invention. In the preferred embodiment, the elastic strand, and first and second substrates are secured together by a plurality of discrete, spaced apart adhesive masses which may or may not be connected by thinner filament sections extending along the elastic strand between the first and second flat substrates. It will be appreciated that the first and second flat substrates may be either completely separate materials secured together or may be portions of the same material which have been folded over to form the first and second substrates with the elastic strand(s) held therebetween. Other applications may require that the elastic strand(s) be adhered to only one surface of a single substrate, i.e., not in a sandwich type construction. It will further be appreciated that various articles may be manufactured in accordance with the invention including hygienic articles, such as diapers, or other articles formed of one or more flat substrates with elasticized portions.

The method may be performed using various types of adhesive filament dispensers and filaments of various cross-sectional shapes and widths. As mentioned above, an expanded swirl or other type of cross-over pattern may be used. In general, however, either overlapping patterns such as swirl patterns, or non-overlapping patterns such as vacillating patterns, may be used to achieve the advantages of this invention. In addition to the above, in which the continuous adhesive filament is moved back and forth or oscillated generally transverse to the direction of movement of the elastic strand, the continuous adhesive filament may be moved back and forth or oscillated generally parallel to the direction of movement of the elastic strand such that discrete points of overlap are formed at spaced apart locations to thereby form the areas of increased adhesive mass. In this case, it may be even more advantageous to use a slot-shaped dispenser for discharging a flatter ribbon shaped filament having a slightly larger width extending transverse to the direction of movement of the elastic strand.

The present invention generally provides superior process control in elastic strand securing applications. The elastic strands are effectively coated with adhesive masses placed at discrete locations along the strand while retaining high production speeds. The adhesive masses form localized areas characterized by high bond strength between the elastic strand(s) and the substrate. At the same time, the elastic properties of the strand(s) will not be significantly compromised at locations between the adhesive masses and this should provide for better creep resistance or retained elasticity in the final product. Since the adhesive attachment method of this invention provides for increased creep resistance or retained elasticity in the final product, it is possible to use finer denier elastic strands. The invention also enables the use of less adhesive. Each of these aspects of the invention results in reducing the costs associated with manufacturing the product. A further increase in creep resistance should be obtainable if the thinner filament sections between adhesive dots are broken leaving separated, discrete areas of adhesive securing the elastic strand to the flat substrate. Low adhesive add-on rates achieved by the invention also lead to enhanced softness of the manufactured article, and less bleedthrough of adhesive through the substrate(s). This latter advantage allows the use of lower gauge substrates leading to further cost reductions.

These and other features, objects and advantages of the invention will become more readily apparent to those of ordinary skill in the art upon review of the following detailed description, taken in conjunction with the accompanying drawings.

DETAILED DESCRIPTION OF PREFERRED EMBODIMENTS

For purposes of this description, words of direction such as "upward", "vertical", "horizontal", "right", "left" and the like are applied in conjunction with the drawings for purposes of clarity in the present description only. As is well known, liquid dispensing devices may be oriented in substantially any orientation, so these directional words should not be used to imply any particular absolute directions for an apparatus consistent with the invention.

Figure 1:
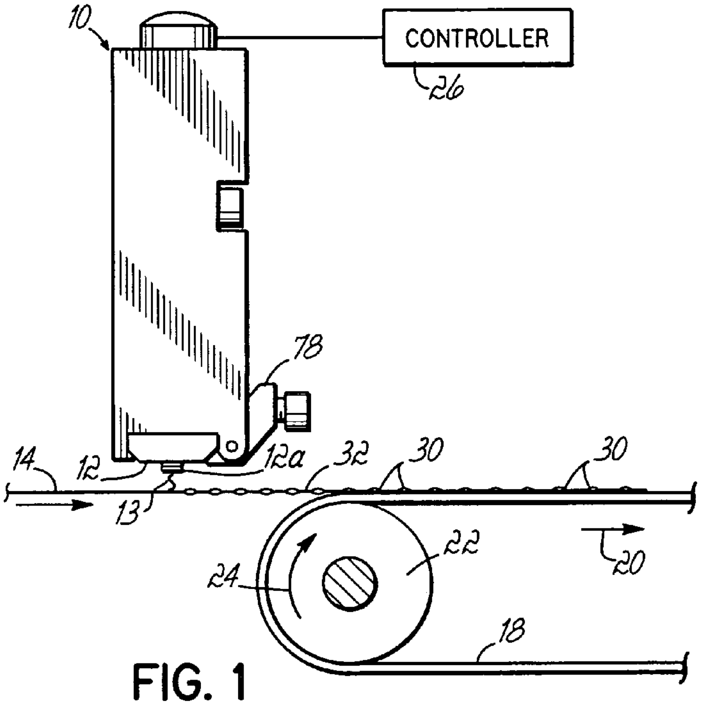
FIG. 1 is a schematic side elevational view of a manufacturing system for an article constructed in accordance with the invention.

FIG. 1 illustrates one embodiment of the method of this invention which uses an adhesive dispenser 10 including a nozzle 12. Nozzle 12 may include a circular adhesive discharge orifice, a more elongate slot-shaped orifice, or other types of orifices suitable for dispensing continuous adhesive filaments 13 of a desired width and with a pattern as discussed in greater detail below. In this embodiment, one or more stretched elastic Lycra strands 14 are moving in the direction of arrow 16 and a flat sheet 18 of substrate material, such as a woven or nonwoven material, is moving in the direction of arrow 20 around a conventional guide cylinder 22 rotating in the direction of arrow 24. Strand 14 is stretched so that, upon attachment to sheet 18, the sheet 18 will be elasticized generally along a line defined by strand 14. Dispenser 10 is operated by a suitable controller 26 for actuating a valve (not shown) within the dispenser 10. Other types of dispensers may be used as well. The apex or tip 12*a* of the nozzle 12 is spaced a short distance from the Lycra strand 14 and accurately dispenses adhesive filaments 13 onto the strand 14 immediately prior to or upstream from the point 32 where the strand 14 meets the substrate 18. As discussed below, the filament 13 is discharged in a pattern that forms discrete areas or masses of adhesive which may form solid dots 30 of adhesive that may or may not be connected by thinner filament sections. During the time that it takes for the strand 14 to reach point 32, dots 30 will preferably flow around all sides of the strand 14 including the lower side (as viewed in FIG. 1) to ensure full bonding between the strand 14 and the upper surface of the substrate 18. In general, it has been found that forming about 4 to 15 adhesive masses per inch achieves good results in elasticized areas of hygienic articles, such as diapers.

Figure 1A:
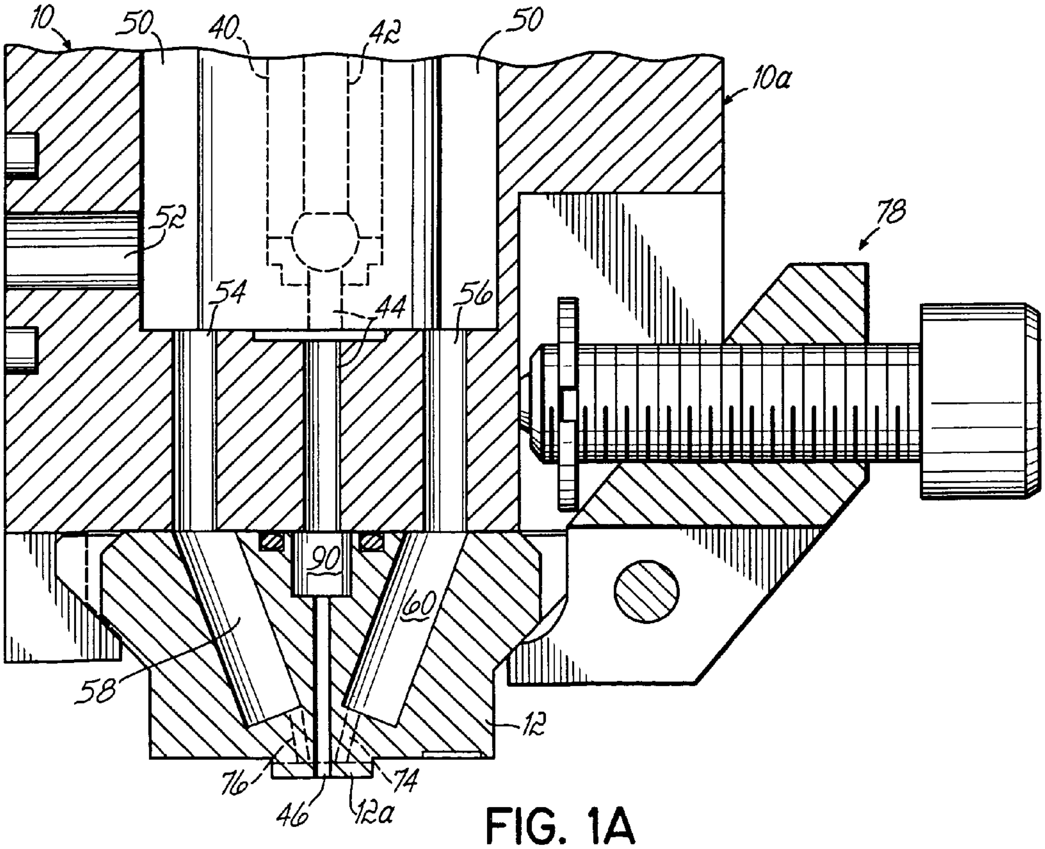
FIG. 1A is a fragmented cross-sectional view of the dispensing portion of a module including one nozzle or die tip configured to dispense an adhesive filament in accordance with a preferred embodiment of the invention.
Figure 2:
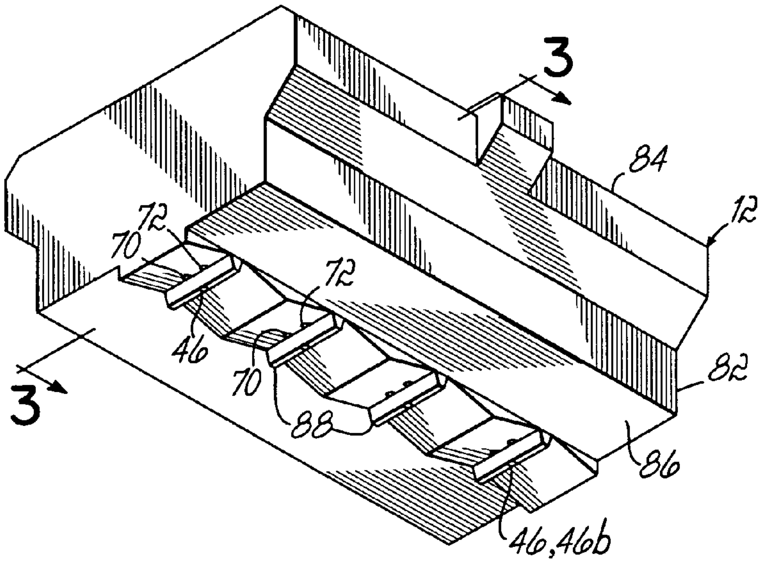
FIG. 2 is a perspective view of the nozzle or die tip of FIG. 1.

Dispenser 10 may be constructed in accordance with the dispenser described in copending U.S. patent application Ser. No. 09/999,244, now U.S. Pat. No. 6,676,038 the disclosure of which is fully incorporated by reference herein. Dispenser 10 uses pressurized air to move a filament of adhesive back and forth in accordance with the inventive principles. It will be appreciated that other types of dispensers may be used instead, including those that use pressurized process air or other manners of moving a filament of adhesive after discharge. For example, electrostatic technology can be used to move a filament of adhesive in manners suitable for use in carrying out the invention. Referring to FIGS. 1A and 2, nozzle or die tip 12 is secured to a lower discharge portion 10*a* of module 10. Discharge portion 10*a* includes an internal cavity 40 including a valve mechanism 42 which reciprocates to open and close a discharge passage 44 allowing and preventing the flow of adhesive from cavity 40 to discharge passage 44. Discharge passage 44 is in fluid communication with a discharge orifice 46 of nozzle or die tip 12 for selectively discharging an adhesive filament 13 (FIG. 1) in accordance with the invention. An annular passage or cavity 50 within the discharge end 10*a* of module 10 receives pressurized process air from an input port 52. This air is communicated to passages 54, 56 which in turn communicate the air to supply passages 58, 60 within nozzle or die tip 12 and finally to four separate process air discharge passages 70, 72, 74, 76 (FIG. 5) surrounding each adhesive discharge passage. A clamp assembly 78 is used to secure nozzle or die tip 12 to module 10 as described in greater detail in the above-referenced patent application Ser. No. 09/999,244.

Referring first to FIGS. 2A and 3–6, a nozzle 12 is shown constructed in accordance with the preferred embodiment. Nozzle 12 includes a body 82 preferably formed from a metal such as brass and having an upper surface 84 and a lower surface 86. A wedge-shaped member 88 is formed on lower surface 86 is generally defined by a pair of converging side surfaces 88*a*, 88*b*. Upper surface 84 is adapted to be secured against the lower face of dispenser 10 and receives liquid material, such as hot melt adhesive, through a liquid inlet recess 90. Recess 90 further communicates with respective liquid discharge passages or orifices 46 having axes 46*a* extending through wedge-shaped member 88. As mentioned above, air supply passages 58, 60 communicate with four air discharge passages 70, 72, 74, 76 extending along respective axis 70*a*, 72*a*, 74*a*, 76*a*.

Figure 3:
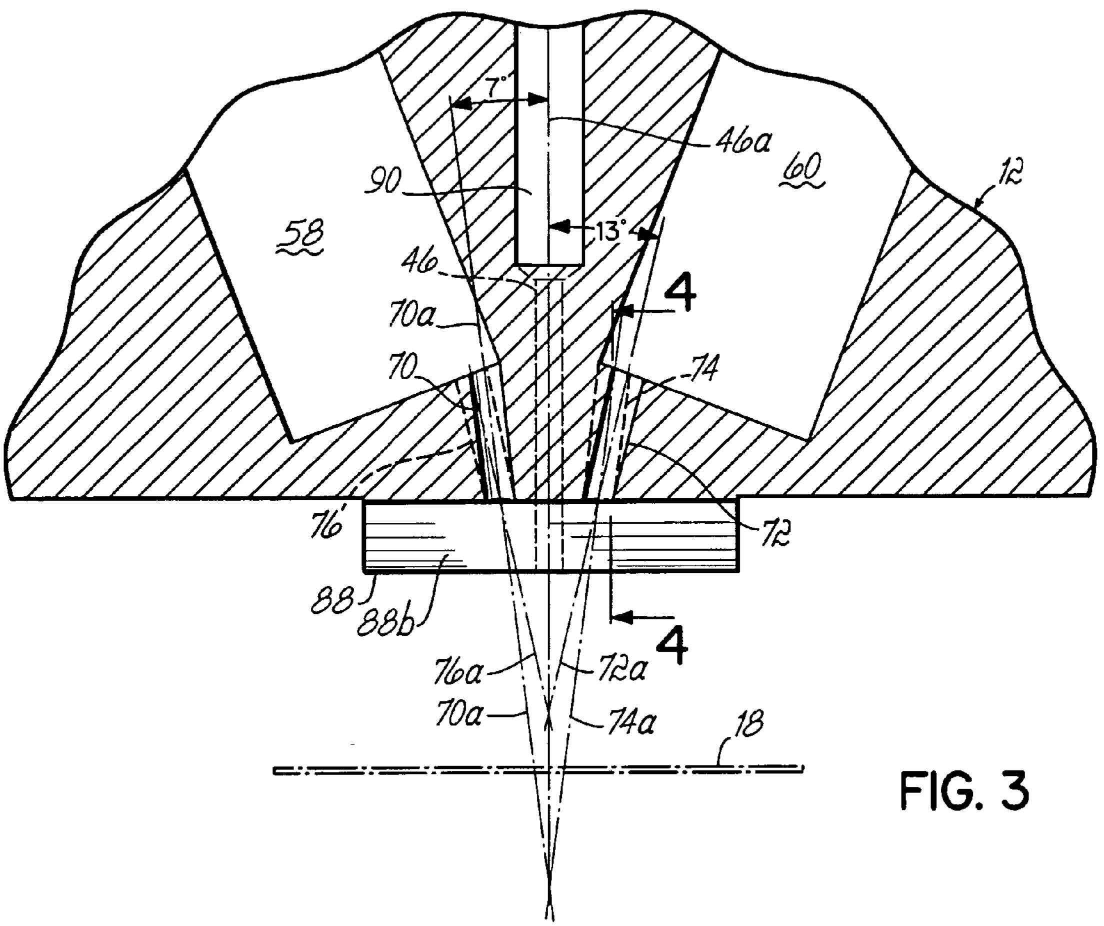
FIG. 3 is a cross-sectional view of the nozzle or die tip taken along line 3—3 of FIG. 2.
Figure 4:
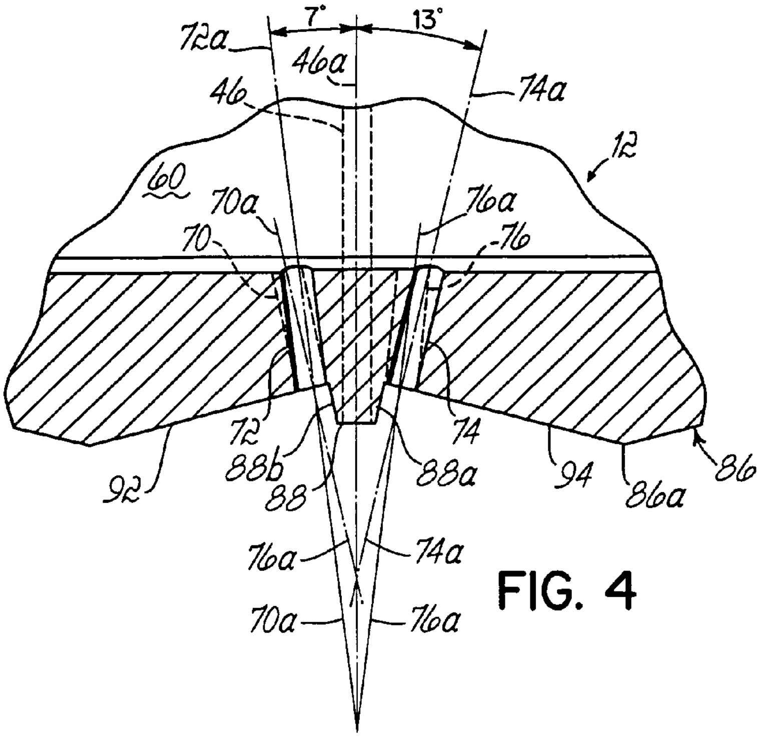
FIG. 4 is a cross-sectional view of the nozzle or die tip taken along line 4—4 of FIG. 3.

Air discharge passages 70, 72, 74, 76 exit on lower surface 86 adjacent the base of wedge-shaped member 88 as best shown in FIG. 3. Air discharge passages 70, 72, 74, 76 therefore discharge pressurized air generally along surfaces 88*a*, 88*b* with a compound angle as best comprehended by reviewing FIGS. 3–5. Wedge-shaped member 88 is positioned centrally between two angled surfaces 92, 94. Angled surfaces 92, 94 angle upwardly toward wedge-shaped member 88 such that the apex of wedge-shaped member 88 and the discharge outlet 46*b* of liquid discharge passage 46 is disposed generally at or above the lowest of lower surface 86 as shown in FIG. 3.

Figure 2A:
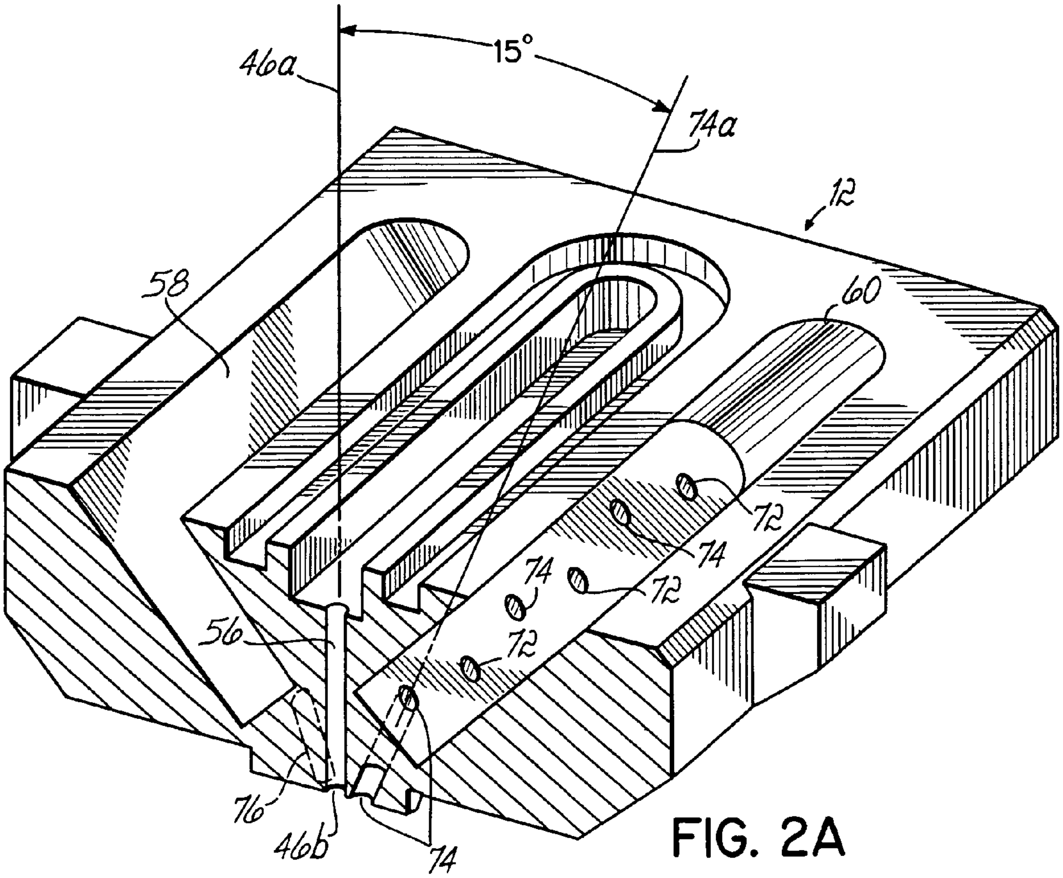
FIG. 2A is a perspective view of the nozzle or die tip shown in FIG. 1 sectioned through one of the adhesive discharge orifices.
Figure 5:
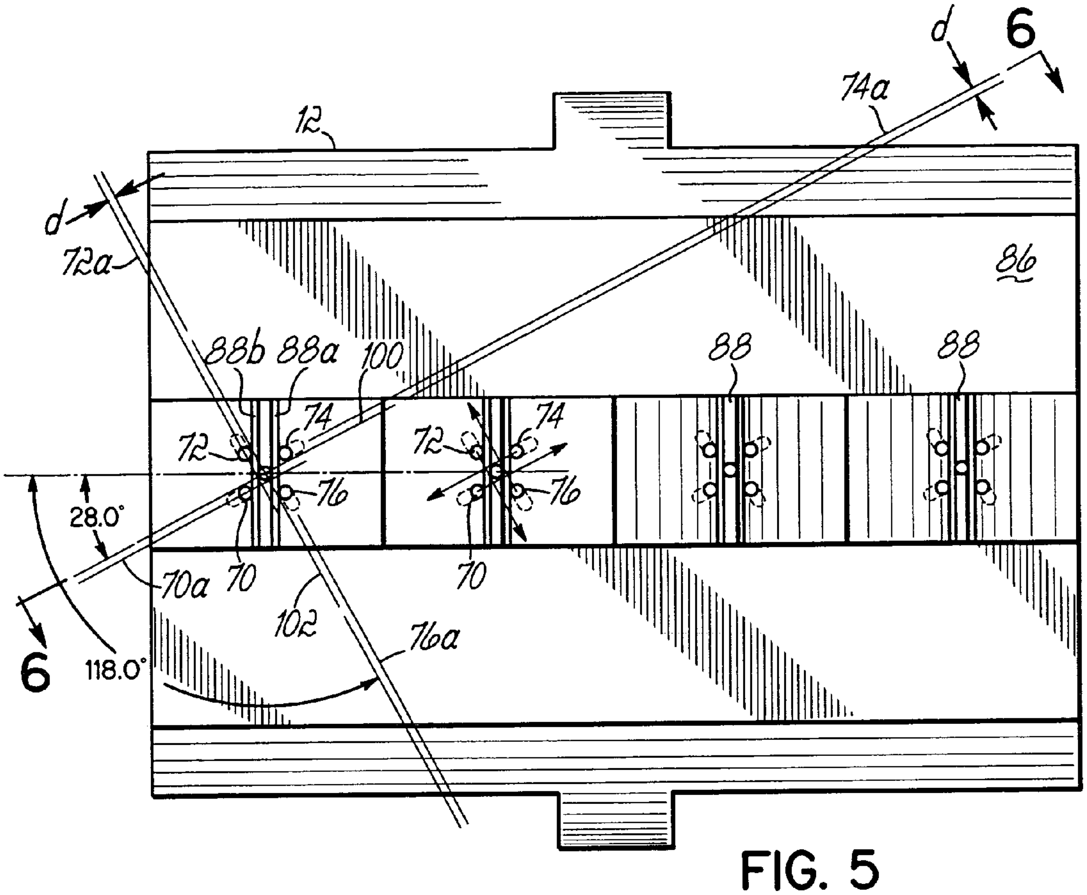
FIG. 5 is a bottom view of the nozzle or die tip of FIG. 1.
Figure 6:
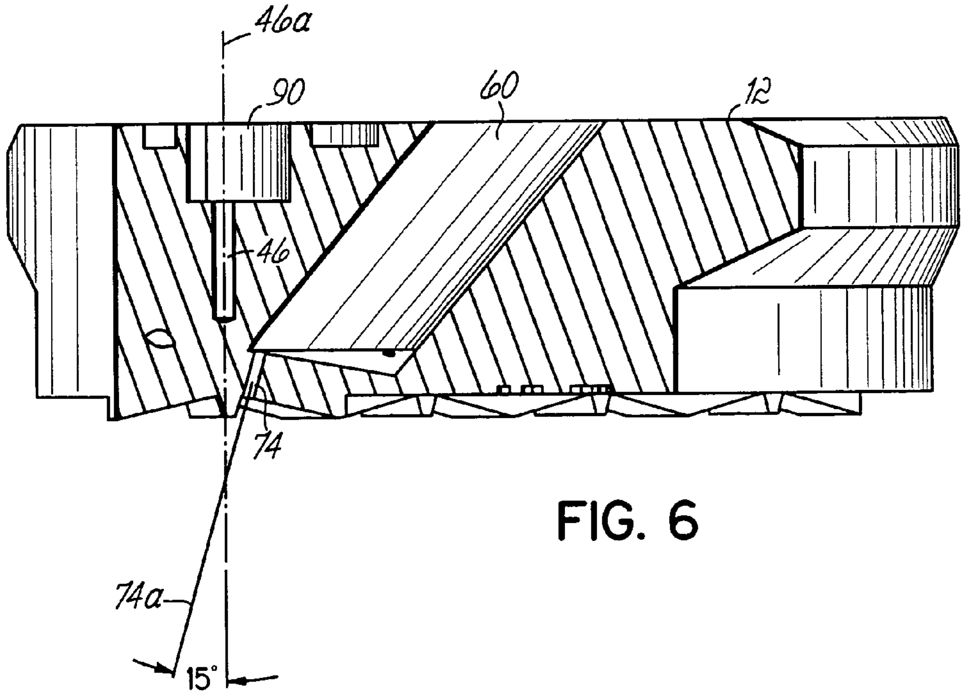
FIG. 6 is a cross-sectional view taken along line 6—6 of FIG. 5.

As viewed from the side of nozzle body 82 (FIG. 3), the axis 70*a*, 74*a* of air discharge passages 70, 74 are disposed preferably at about 7° from the axis 46*a* of liquid discharge passage 46. The axis 72*a*, 76*a* of passages 72, 76 are preferably disposed at about 13° from axis 46*a*. As viewed from the front (FIG. 4), axes 70*a*, 74*a* are at about 13° relative to axis 46*a* and axes 72*a*, 76*a* are at about 7° relative to axis 46*a*. This difference in the angles as viewed from the sides and the front is due to the presence of an offset of the axis of each generally diametrically opposed air discharge passage 72, 76 and 70, 74 as shown in FIG. 5. The true angle of each air discharge passage 70, 72, 74, 76 relative to axis 46*a* in the preferred embodiment is 15° as shown in FIGS. 2A and 6. In accordance with the invention, the axes 70*a*, 74*a* of respective air discharge passages 70, 74 are offset in opposite directions relative to an axis 100 which is normal to axis 46*a*. In the preferred embodiment, each axis 70*a*, 74*a* is offset by the same dimension "d" from axis 100. When passages 46, 70, 72, 74, 76 have diameters in the range of 0.010 inch to 0.020 inch as is typical in the hot melt adhesive dispensing industry, for example, the minimum offset dimension "d" is in a corresponding range of about 0.005 inch to about 0.015 inch. In the preferred embodiment, liquid discharge passage 46 has a diameter of 0.018 inch, as do process air discharge passages 70, 72, 74, 76. The offset dimension "d" of each air discharge passages 70, 72, 74, 76 with respect to axis 46*a* is 0.009 inch. Axes 72*a*, 76*a* are offset relative to an axis 102 to extending normal to axis 46*a* preferably by the same distance as axes 70*a*, 74*a* are offset from axis 46*a* as better illustrated by referring to axis 100 which is normal or perpendicular to axis 46*a* and parallel to axes 70*a*, 74*a*. However, it is also contemplated that different offset dimensions may be utilized between the various axes. For example, the offset dimensions between axes 70*a*, 74*a* and axis 100 may equal each other but may not equal the offset dimensions between axes 72*a*, 76*a* and axis 102. In other words, the offsets between axes 72*a*, 76*a* and axis 102 may equal each other but be smaller or larger than the offsets between axes 70*a*, 74*a* and axis 100. The line speed of the elastic strand(s) 14 and flat substrate 18 is in the range of 150–300 meters/minute. The process air pressure is in the range of 3–15 psi and the add-on rate of adhesive to the strand 14 is in the range of 10–50 mg/m/strand. A standard pressure sensitive hot melt adhesive may be used having a viscosity of about 5000–6000 cps. The discharge outlet 46*b* may be placed about ¼" from the strand 14.

The four air discharge passages 70, 72, 74, 76 form a generally square pattern around the liquid discharge passage 46 at the base of wedge-shaped member 88. Diagonally opposite air discharge passages or, in other words, air discharge passages disposed at opposite corners of the square-shaped pattern are symmetric and disposed in planes that are at least nearly parallel to each other. Air discharge passages 72, 76 and 70, 74, respectively, are each offset in the equal manner described above with respective axis 100, 102 such that the air stream discharged from each air discharge passage 70, 72, 74, 76 is tangential to the liquid filament discharging from passage 46, as opposed to directly impacting the filament discharging from passage 46. The larger the offset between axis 70*a*, 74*a* and axis 100, and between axis 72*a*, 76*a* and axis 102, the larger or more open is the liquid swirl pattern created. Preferred minimum offset is equal to the radius of any air discharge passages 70, 72, 74, 76. Preferably, the offset dimensions of the respective pairs of air discharge passages 70, 74 and 72, 76 are also equal.

Figure 7:
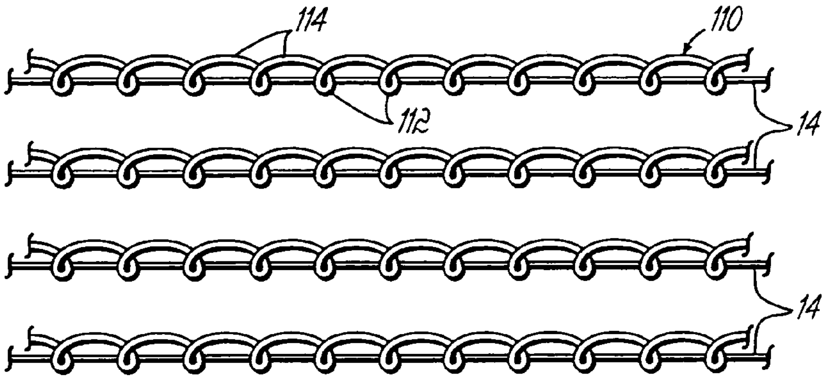
FIG. 7 is a schematic view of expanded swirled adhesive patterns according to the invention applied to respective elastic strands.

FIG. 7 schematically illustrates an expanded swirl pattern 110 dispensed onto elastic strands 14 in accordance with the principles of this invention. Swirl pattern 110 has crossover points 112 which define and form adhesive masses. Adhesive masses 112 are connected together by thinner filament sections 114.

Figure 8:
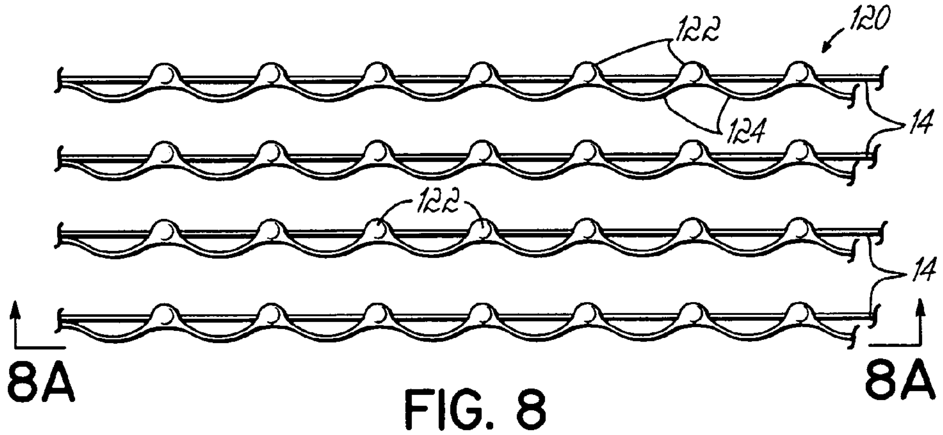
FIG. 8 is a schematic view of one alternative type of adhesive pattern according to the invention applied on respective elastic strands with discrete points of increased adhesive coupled by thinner filament sections.
Figure 8A:
FIG. 8A is a side view of the adhesive pattern of FIG. 8, taken along line 8A—8A, illustrating that the adhesive masses have enveloped the corresponding elastic strand on which they are deposited.

FIGS. 8 and 8A illustrate a pattern 120 dispensed onto strands 14 in which the respective adhesive masses 122 have conglomerated to form more solid masses. Adhesive masses 122 are shown to be coupled by thinner filament sections 124 which may generally have curvatures as shown. It should be understood, however, that the actual patterns in practice will be more irregularly shaped typically than those shown in the figures. The respective adhesive masses may not have uniform shapes as shown. Sufficient adhesive will be deposited around the strands 14, the flat substrate or sheet to enable proper bonding of the substrate (not shown) and strands 14. FIG. 8A illustrates pattern 120 in side elevational view. As is apparent from this view, adhesive masses 122 have enveloped elastic strand 14 such that adhesive is positioned above and below strand 14. Thinner filament sections 124 will typically drop below strand 14 when the adhesive is dispensed from above and may also tend to wrap partially around the bottom of strand 14 if they remain unbroken.

Figure 9:
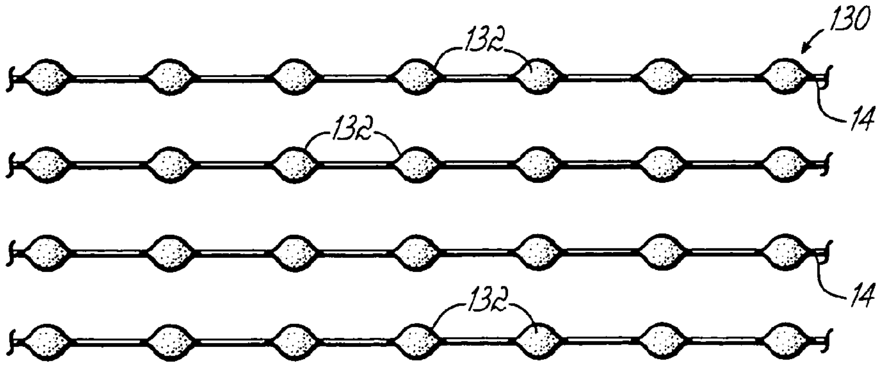
FIG. 9 is a schematic view of another alternative type of adhesive pattern in accordance with the invention showing that the thinner filament sections have all broken back onto the discrete points of increased adhesive to form an intermittent pattern of adhesive dots.

FIG. 9 illustrates an adhesive pattern 130 in which the thinner filament sections between adhesive masses 132 have all broken thereby forming adhesive masses 132 into discrete, separated dots or masses of adhesive.

Figure 10:
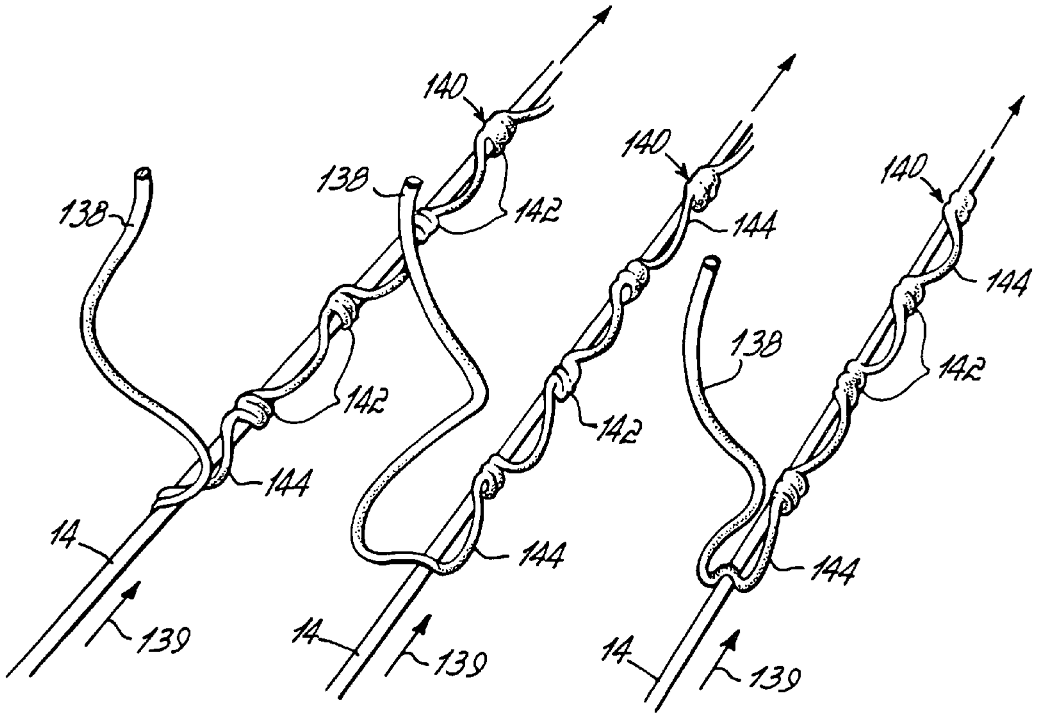
FIG. 10 is a perspective view of adhesive patterns being applied to multiple strands in accordance with the invention.
Figure 11:
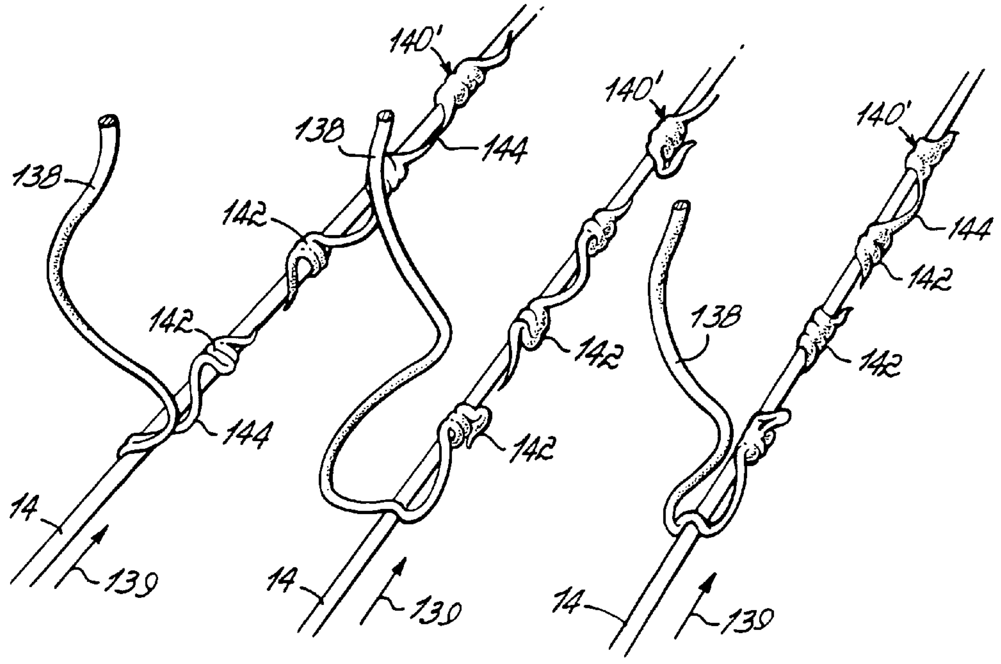
FIG. 11 is a perspective view of adhesive patterns being applied to multiple strands in a manner similar to FIG. 10 but illustrating broken filament sections between adjacent adhesive masses.

FIGS. 10 and 11 are perspective views showing multiple elastic strands 14 having adhesive filaments 138 dispensed thereon as the strands 14 move in the machine direction of arrows 139. Filaments 138 may be dispensed from a multi-orifice nozzle such as nozzle 12 shown and described with respect to FIG. 2. In accordance with the inventive principles, filament 138 is discharged in a manner which produces an adhesive pattern 140 having larger adhesive masses 142 separated by thinner filament sections 144. As with the previously described adhesive patterns, some or all of the thinner filament sections 144 may stretch enough to break resulting in an adhesive pattern 140' with discrete, separated adhesive masses 142 as shown in FIG. 11.

A number of factors contribute to the improved results of the invention. Generally, these relate to the movement of the adhesive filament in the air prior to reaching the elastic strand. Although the movement is a crossing pattern in the form of an expanded swirl pattern in the preferred embodiment, other crossing patterns or non-crossing patterns may be used to achieve the inventive principles. For example, a non-crossing vacillating or generally sinusoidal pattern may be used in place of an expanded swirl pattern. To achieve the best results with either of these general types of patterns, the width of the pattern transverse to the machine direction must be narrow enough to maintain control of the filament on the elastic strand. That is, the filament pattern should not be so wide as to hang considerably off the elastic strand. In this manner, distinct adhesive masses may be formed rather than a more uniform and excessive coating of the elastic strand. Also, the adhesive filament should have a component of movement, such as a swirling or vacillating movement, which is in the machine direction and an alternating component of movement which is opposite to the machine direction. The adhesive filament movement in the machine direction causes a momentary build-up of adhesive on the elastic strand to form a distinct adhesive mass on the strand. The adhesive filament movement in the opposite direction causes a momentary stretching of the adhesive filament to form the thinner filament sections. If the relative speed differential between the adhesive filament and the elastic strand is great enough during this movement in the opposite direction, then the filament will break between two consecutive adhesive masses.

While the present invention has been illustrated by a description of various preferred embodiments and while these embodiments has been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

What is claimed is:

1. An article comprising:

a first flat substrate, and an elastic strand secured on said first flat substrate by a plurality of adhesive masses extending along and contacting said elastic strand and said first flat substrate, at least some of said adhesive masses being coupled together by thinner adhesive filament sections.

2. The article of claim 1, further comprising a second flat substrate, said first and second flat substrates adhered to opposite sides of said elastic strand by said adhesive masses.

3. The article of claim 1, further comprising:

a plurality of elastic strands secured on said first flat substrate by a plurality of adhesive masses respectively extending along said elastic strands, at least some of said adhesive masses along each of said elastic strands being coupled together by thinner filament sections.

4. The article of claim 3, further comprising a second flat substrate, said first and second flat substrates adhered to opposite sides of said elastic strands by said adhesive masses.

* * * * *